United States Patent
Stess

(10) Patent No.: US 10,408,628 B2
(45) Date of Patent: Sep. 10, 2019

(54) METHOD AND APPARATUS FOR COMPARING TWO MAPS WITH LANDMARKS DEPOSITED THEREIN

(71) Applicant: VOLKSWAGEN AG, Wolfsburg (DE)

(72) Inventor: Marek Stess, Ronnenberg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/497,242

(22) Filed: Apr. 26, 2017

(65) Prior Publication Data
US 2017/0307386 A1   Oct. 26, 2017

(30) Foreign Application Priority Data
Apr. 26, 2016   (DE) .......... 10 2016 207 089

(51) Int. Cl.
| | | |
|---|---|---|
| G01C 21/30 | (2006.01) | |
| G06K 9/62 | (2006.01) | |
| G06F 16/29 | (2019.01) | |
| G01C 21/00 | (2006.01) | |
| G01C 21/36 | (2006.01) | |

(52) U.S. Cl.
CPC ............ *G01C 21/30* (2013.01); *G06F 16/29* (2019.01); *G06K 9/6215* (2013.01); *G01C 21/005* (2013.01); *G01C 21/3644* (2013.01); *G06K 9/6211* (2013.01)

(58) Field of Classification Search
CPC .. G01C 21/30; G01C 21/005; G01C 21/3644; G06K 9/6215; G06K 9/6211; G06F 17/30241
See application file for complete search history.

(56) References Cited

U.S. PATENT DOCUMENTS

| | | | |
|---|---|---|---|
| 2006/0064202 A1* | 3/2006 | Gutmann ............. | G05D 1/0221 700/245 |
| 2011/0279652 A1 | 11/2011 | Eggert et al. | |
| 2014/0164415 A1 | 6/2014 | Duleba | |

OTHER PUBLICATIONS

Brovelli et al., Towards an Automated Comparison of OpenStreetMap with Authoritative Road Datasets, Transactions in GIS, 2017, vol. 21, No. 2, pp. 191-206.
Foote et al., Error, Accuracy, and Precision, The Geographer's Craft Project, Department of Geography, The University of Colorado at Boulder, 1995, pp. 1-11.
Thapa et al., Accuracy of Spatial Data Used in Geographic Information Systems, Photogrammetric Engineering & Remote Sensing, Jun. 1992, vol. 58, No. 6, pp. 835-841.
Search Report for German Patent Application No. 10 2016 207 089.4; dated Feb. 24, 2017.

* cited by examiner

*Primary Examiner* — Nadeem Odeh
*Assistant Examiner* — Michael V Kerrigan
(74) *Attorney, Agent, or Firm* — Barnes & Thornburg LLP

(57) ABSTRACT

A method for comparing two maps with landmarks stored therein. The method includes comparing at least one portion of the first map with a corresponding portion in the second map, wherein a similarity between the portion of the first map and the corresponding portion in the second map is determined based on a correspondence between the landmarks respectively stored in the two portions, and wherein the similarity of the compared portion is expressed as a similarity value derived therefrom. Also disclosed is an associated apparatus, an associated computer program including program code, and an associated computer program product including program code.

11 Claims, 5 Drawing Sheets

METHOD AND APPARATUS FOR COMPARING TWO MAPS WITH LANDMARKS DEPOSITED THEREIN

PRIORITY CLAIM

This patent application claims priority to German Patent Application No. 10 2016 207 089.4, filed 26 Apr. 2016, the disclosure of which is incorporated herein by reference in its entirety.

SUMMARY

Illustrative embodiments relate to a method and an apparatus for comparing two maps with landmarks stored therein. Illustrative embodiments also relate to comparing landmark maps, which are used for locating purposes by means of landmarks stored therein.

BRIEF DESCRIPTION OF THE DRAWINGS

Below, the disclosed embodiments are explained in more detail, with reference being made to the figures. In detail.

DETAILED DESCRIPTION

Figure 1:
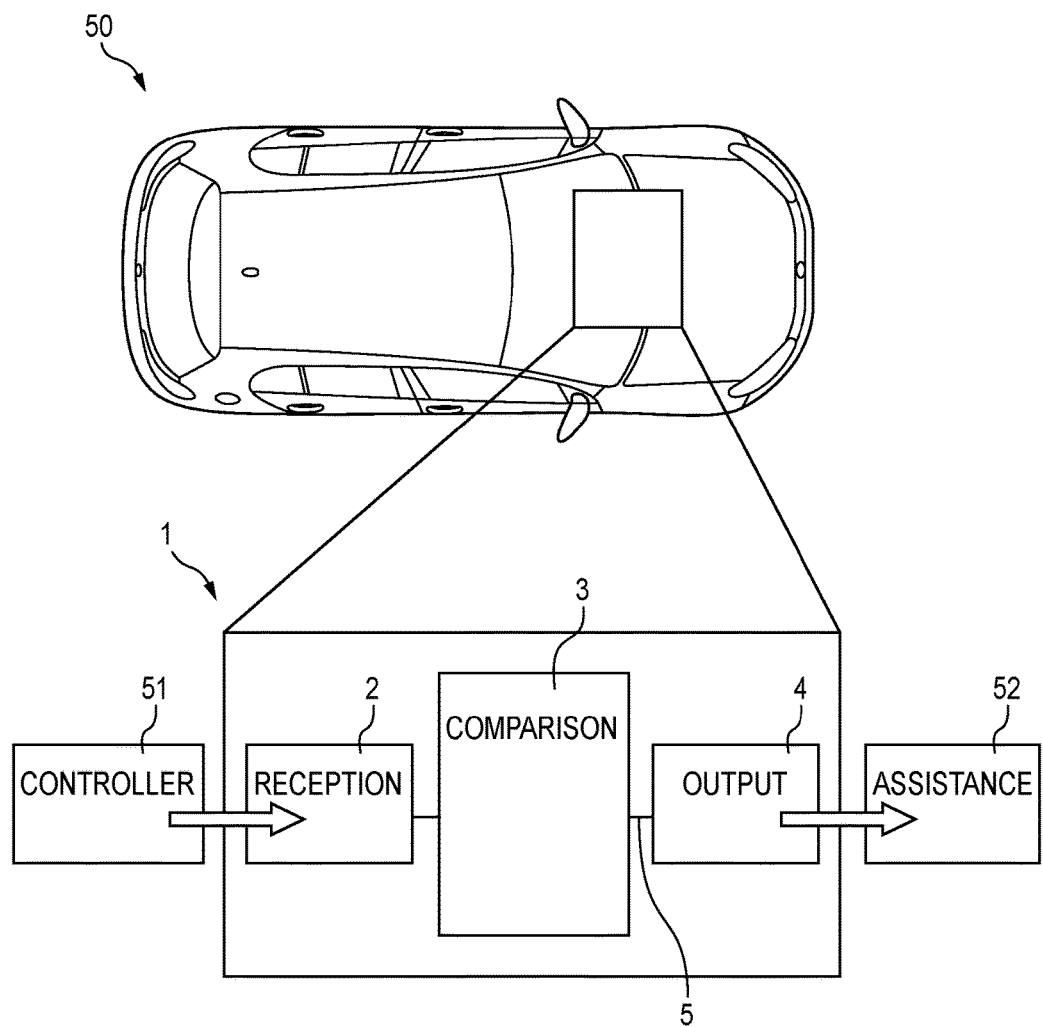
FIG. 1 shows a schematic illustration of a disclosed embodiment of an apparatus for comparing two maps with landmarks stored therein.

A map which contains landmarks as locating features is required for navigating in surroundings, especially in the case of automated journeys of vehicles and other transport means. By way of example, a location and an orientation may be determined on the basis of these landmarks. As a rule, such maps are provided by an external source. By way of example, an external source may be a company which specializes in the production of maps or a corresponding service. For the purposes of ensuring a precise localization, it is important, in respect of these provided maps, to determine whether a provided map meets predetermined quality requirements, for example, for carrying out an automated journey in the surroundings described by the provided map.

Disclosed embodiments provide a method and an apparatus for comparing two maps with landmarks stored therein, within the scope of which a quality of a map may be assessed.

According to the disclosed embodiments, the technical problem is solved by a method, an apparatus, a computer program, and a computer program product.

A method for comparing two maps with landmarks stored therein is provided, the method comprising the following operations: comparing at least one portion of the first map with a corresponding portion in the second map, wherein a similarity between the portion of the first map and the corresponding portion in the second map is determined on the basis of a correspondence between the landmarks respectively stored in the two portions, and wherein the similarity of the compared portion is expressed as a similarity value derived therefrom.

Further, an apparatus for comparing two maps with landmarks stored therein is developed, the apparatus comprising a comparison device, wherein the comparison device is embodied to compare at least one portion of a first map with a corresponding portion in a second map and determine a similarity between the portion of the first map and the corresponding portion in the second map on the basis of a correspondence between the landmarks respectively stored in the two portions, and wherein the comparison device is furthermore embodied to express the similarity of the compared portion as a similarity value derived therefrom.

In a further disclosed embodiment, a computer program comprising program code means is provided for carrying out all operations of the disclosed method when the program is executed on a computer.

Associated therewith, provision is made of a computer program product comprising program code means stored on a computer-readable data medium for carrying out the disclosed method when the program product is executed on a computer.

The basic concept of the disclosed embodiments is that of evaluating two maps in respect of the similarity thereof by comparing the landmarks stored in these maps. Here, the first map may be, e.g., a reference map, in which many landmarks or distinguished landmarks are stored. Then, the second map is, e.g., a map purchased from a service provider or a map which was captured and created at that instant by means of a sensor system for the surroundings. The similarity value derived from the comparison allows an estimate to be made in respect of the number of landmarks which are present in both maps and which correspond to one another.

Here, landmarks should be features of a road infrastructure, for example, road markings such as arrows, full and dashed lines, stop lines, but also posts, poles and road signs. By way of example, the landmarks may be stored in the maps as metadata at the corresponding positions.

However, it is also possible that it is initially necessary to capture, recognize and classify landmarks by means of an additional device for capturing the surroundings, for example, by way of known object and pattern recognition methods. By way of example, such a device for capturing the surroundings may be a laser scanner, an ultrasound sensor system and/or a camera, etc.

By way of example, if the first map is a good reference map, i.e., if many landmarks or relevant landmarks are stored therein, then a second map may be assessed in terms of the quality thereof by way of the comparison with the reference map. The derived similarity value then expresses the similarity with the first map (reference map), with a high similarity being tantamount to a high quality of the second map, whereas a low similarity means a low quality of the second map.

Provision may be made in a disclosed embodiment for the apparatus to comprise a receiving device, which is embodied to receive the first map and/or the second map and provide the map(s) to the comparison device.

In at least one disclosed embodiment, provision is further made for the apparatus to comprise an output device, which is embodied to output and/or provide the similarity value derived by the comparison device. By way of example, the derived similarity value may be provided to an assistance system of a motor vehicle. Then, the assistance system is able to make a statement about the quality of the first map and/or second map on the basis of the provided similarity value and decide whether or not precise navigation and/or an automated journey is possible.

Provision may be made for maps provided by different service providers to be compared to one another. Further, it is moreover also possible for, e.g., different generations of maps created by the same service provider, e.g., a surroundings detection device, at different times to be compared to one another. In this way, it is possible to ascertain a change between the various generations.

In a further disclosed embodiment, provision is made for the similarity value to be calculated on the basis of an F1 characteristic derived by means of the "precision" and "recall" functions. Here, the "precision" function denotes the precision of the correspondence of the landmarks between the portion of the first map and the corresponding portion in the second map. By contrast, the "recall" function denotes the hit ratio. The precision ("precision") is calculated as the proportion of the corresponding, relevant landmarks. By way of example, if the first map is considered to be the reference map and nine landmarks are situated in a compared portion in this reference map, the precision ("precision") when identifying seven landmarks in the corresponding portion in the second map equals 4/7 if only four are correct. Accordingly, the value for the hit ratio ("recall") is calculated as 4/9, since 4 of the total of nine landmarks present in the reference map are stored correctly in the second map.

To obtain a single characteristic, the F1 characteristic combines the results for the precision ("precision") and the hit ratio ("recall") by way of the weighted harmonic mean:

$$F_1 = 2 \frac{\text{precision} \cdot \text{recall}}{\text{precision} + \text{recall}}$$

Here, an F1 characteristic of 1 means that the first map and the second map are completely congruent, whereas a value of 0 means that there is absolutely no correspondence or similarity between the first map and the second map.

In a further disclosed embodiment, provision is made for a further similarity value to be determined for at least one further portion in the first map and a corresponding further portion in the second map. Here, the further similarity value is determined in the same way as the similarity value. Therefore, a plurality of portions of both maps may be compared to one another. In this way, it is possible, for example, to ascertain the quality of a map at a plurality of positions in a random-sampling style.

In at least one disclosed embodiment, provision is further made for the at least one portion and the at least one further portion in each case to form points on a continuous trajectory in the first map or the second map. This facilitates "travel" along specific test routes, for example, a specific road, in both maps. In this way, it is possible, for example, to select trajectories in which a certain number or specific variations of landmarks occur. Then, it is possible to carry out a comparison or determine the quality by means of such a predetermined test route.

Here, provision is made in at least one disclosed embodiment for the quality only to be determined on the basis of a fixedly predetermined test route in a reference map. As a result, it is possible, for example, to determine the quality of a map merely on the basis of a highly precise reference map which only comprises portions comprising the test route. By way of example, such a restricted reference map may be stored in a motor vehicle. Provided maps may then be examined in respect of the quality thereof by means of the restricted reference map. Such a random sample allows a statement to be made about the entire provided map, without large amounts of data needing to be stored for the reference map.

Provision may further be made for the at least one portion and the at least one further portion to overlap. This facilitates multiple checking of regions in the maps in respect of a correspondence. It is, therefore, possible to average over parts of a compared portion. For example, there are portions in which only a few landmarks are present. In these, a present correspondence or a missing correspondence of individual landmarks has a pronounced effect on the similarity value derived therefrom. As a result of the overlap, it is possible then to ascertain an averaged value for this portion in the map.

Provision may be made in at least one disclosed embodiment for the geometric form and/or the dimension of the respectively compared portion to be able to be set. Accordingly, provision may be made for an increment between the portions, for example, along a trajectory, to be able to be set. Here, values of centimeters up to meters or even kilometers are possible both for the selected dimension and for the selected increment, depending on the spatial resolution of the maps. Here, for example, a required computational outlay when comparing the two maps or a desired spatial resolution when determining the similarity value is decisive when selecting the values.

In a further disclosed embodiment, provision is made for an overlap region of the first map and of the second map to be completely decomposed into portions, wherein a similarity value is in each case determined for each of the portions. Hence, there may be a complete comparison for the overlap region, i.e., the geographic region for which data is present both in the first map and in the second map.

Provision may be made in at least one disclosed embodiment for the similarity values determined for the portions to be stored in a map at positions corresponding to the respective portions. In this way, a map may be created which, in a spatially resolved manner, maps the similarity of the maps or the quality of a map in relation to a reference map. By way of example, this facilitates determining the regions in which a map meets the required quality standard and the regions in which a required quality standard is not met. By way of example, an automated journey may be blocked in regions with an insufficient quality, as there are not enough landmarks available for localization purposes. However, the spatially resolved quality data may also serve to prepare or assist planning for the capture and storage of further landmarks in the appropriate regions.

In at least one disclosed embodiment, provision is made for all similarity values determined for the individual portions to be combined to form an arithmetic mean value, wherein the arithmetic mean value is subsequently output and/or provided. Therefore, a single similarity value may be provided for the two maps. This likewise facilitates expressing the quality of a map by a comparison with a reference map by way of a single value. Here, it is possible to compare an entire overlap region of the two maps and form an arithmetic mean from all derived similarity values. However, alternatively, it is also possible that only portions around a test route are considered, with an arithmetic mean being formed over these portions. Therefore, it is possible to drastically reduce the computational outlay for the comparison. Here, it is beneficial, if a test route containing a certain number and/or certain variations of landmarks is selected such that the averaged similarity value has great and representative significance over the whole map.

The described method and the described apparatus are suitable for use in motor vehicles driving in an automated or semi-automated manner, but may also be used in self-driving robots, drones, boats or any other transport means controlled in an automated or semi-automated manner.

FIG. 1 shows a schematic illustration of an apparatus 1 for comparing two maps with landmarks stored therein. The apparatus 1 is installed in a motor vehicle 50, and so, for example, it may be used for ascertaining the quality of a map to be used when locating or navigating the motor vehicle 50. The apparatus 1 comprises a reception device 2, a comparison device 3, and an output device 4. The reception device 2 receives the first map and the second map, for example, from a controller 51 of the motor vehicle 50. The reception device 2 subsequently provides the first map and the second map to the comparison device 3. The comparison device 3 compares the first map to the second map in accordance with the described method and ascertains a similarity value 5. The similarity value 5 is forwarded from the comparison device 3 to the output device 4, output by the latter and made available to, for example, an assistance system 52 of the motor vehicle 50, for example, a navigation device. By way of example, the assistance system 52 may then make a decision on the basis of the similarity value 5 as to whether or not the map to be used satisfies predetermined quality criteria.

Figure 2:
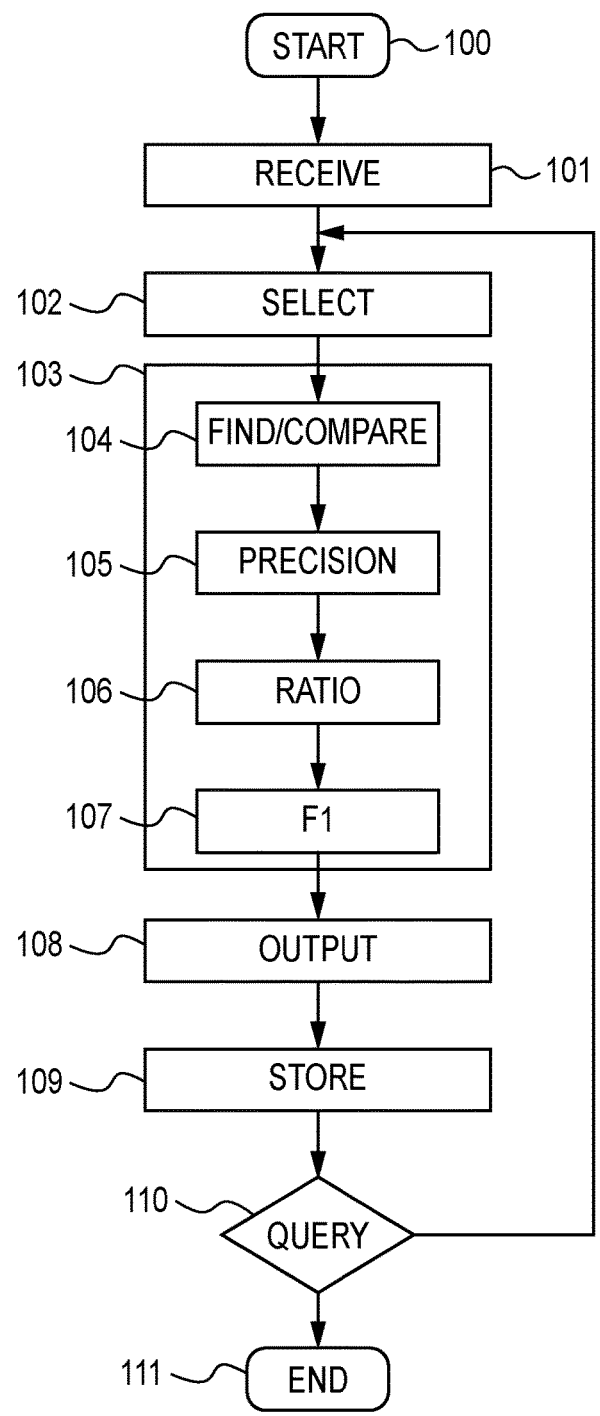
FIG. 2 shows a schematic flowchart of the method for comparing two maps with landmarks stored therein.

FIG. 2 shows a schematic flowchart of a disclosed embodiment of the method. The first map and the second map are received 101 by a reception device after the start 100 of the method. Then, portions respectively corresponding to one another are selected 102 in the first map and in the second map. Here, provision may be made for a test to be carried out in advance as to whether the maps in each case image portions which comprise geographically identical locations or localities, i.e., whether or not an overlap region exists. The selection of the portion and of the corresponding portion takes place based on a trajectory predetermined in the two maps. Ideally, the trajectory is composed of portions which overlap one another.

After the portions are selected, the comparison 103 of the portion in the first map with the corresponding portion in the second map begins. To this end, landmarks are initially found and compared 104 in the selected portions. The precision ("precision") is calculated 105 on the basis of the landmarks found in the two maps. Here, one map, for example, the first map, is used as a reference and the other map, for example, the second map, is correspondingly used as a test map. Further, the hit ratio ("recall") is calculated 106 on the basis of the found landmarks. The F1 characteristic is calculated in the last method operation at 107 of the comparison 103 from the precision and the hit ratio.

The calculated F1 characteristic is subsequently output or provided 108. The provided F1 characteristic is then stored 109 at a location corresponding to the portions in a further spatially resolved map. Further, provision may also be made for storing the provided F1 characteristic at the corresponding location in one of the compared maps.

In the next method operation at 110 there is a query as to whether or not all portions of the predetermined trajectory have already been compared. If it is not yet the case that all portions have been compared, method operations 102 to 110 are repeated for a subsequent portion along the trajectory. Otherwise, the method is completed 111.

Figure 3B:
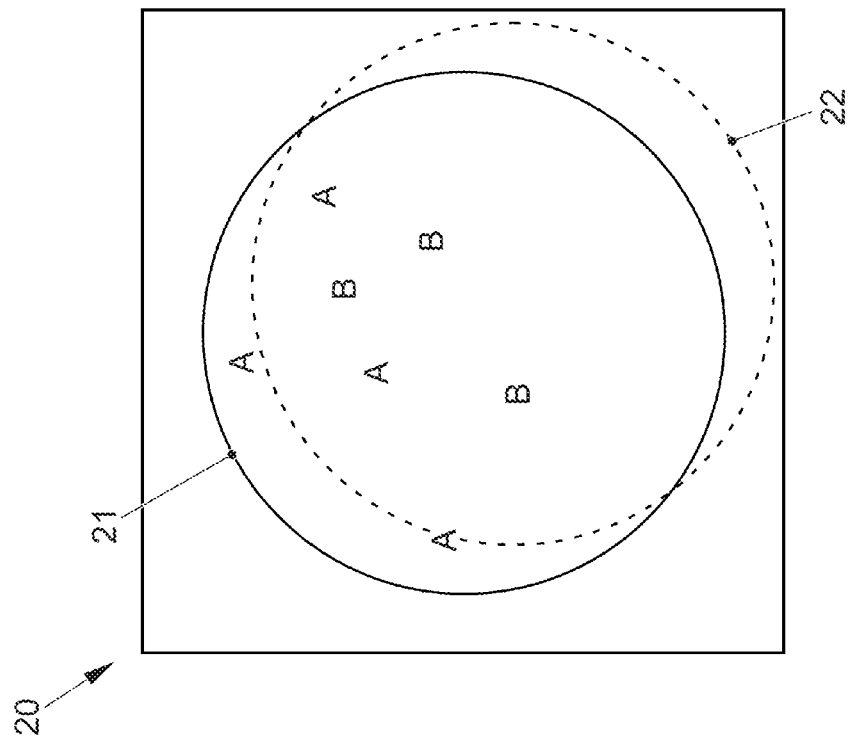
FIG. 3b shows a schematic illustration of a portion in a second map, corresponding to the portion depicted in FIG. 3a, for elucidating the calculation of the similarity value.
Figure 3A:
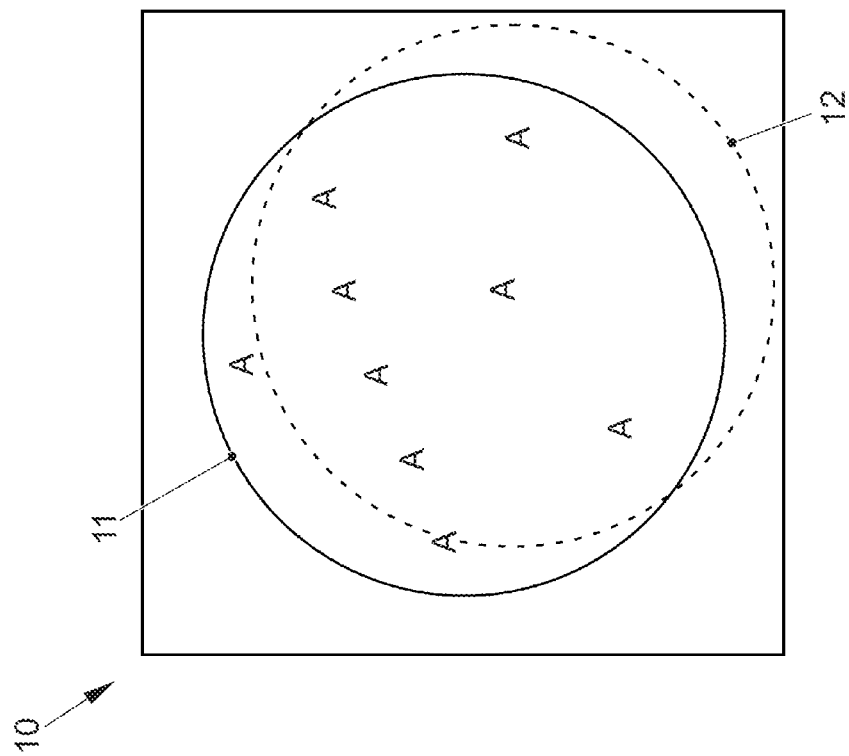
FIG. 3a shows a schematic illustration of a portion belonging to a first map for elucidating the calculation of the similarity value.

For the purposes of elucidating the calculation of the similarity value, FIGS. 3a and 3b show, in an exemplary manner, a portion 11 in a first map 10 (FIG. 3a) and a corresponding portion 21 in a second map 20 (FIG. 3b). By way of example, the first map 10 is considered to be a reference map here. By contrast, a statement about the quality of the second map 20 in respect of the reference map should be made by means of the method.

Both portions 11, 21 respectively comprise landmarks A, B. Here, landmarks A, B should be parts of a road infrastructure, for example, road markings such as arrows, full and dashed lines, stop lines, but also posts, poles and road signs, and the like.

The portion 11 in the first map 10 has a total of nine landmarks A. By contrast, the corresponding portion 21 in the second map 20 only has seven landmarks A, B. The similarity of the two maps 10, 20 is now determined as follows. First, a precision ("precision") of the second map 20 in relation to the first map 10 is calculated. To this end, the landmarks A, B in the two portions 11, 21 are compared to one another. Here, for example, four landmarks A of the seven landmarks A, B in the portion 21 in the second map 20 can be assigned to respectively corresponding landmarks A in the portion 11 in the first map 10. By contrast, the remaining landmarks B in the portion 21 of the second map 20 do not correspond to the landmarks A in the portion 11 of the first map 10. Therefore, the precision ("precision") is calculated as 4/7 since there is correspondence in the case of four landmarks A of seven available landmarks A, B.

Further, a hit ratio ("recall") is calculated. Four landmarks A of the total of nine landmarks A in the portion 11 of the first map 10 were found in the portion 21 of the second map 20. Hence, the hit ratio ("recall") is calculated as 4/9.

From the calculated precision ("precision") and the hit ratio ("recall"), the F1 characteristic for this example may be calculated as:

$$F_1 = 2 \frac{\frac{4}{7} \cdot \frac{4}{9}}{\frac{4}{7} + \frac{4}{9}} = \frac{1}{4}$$

Thus, using the F1 characteristic, the similarity between the two maps 10, 20 may be estimated as 1/4 by way of the comparison of the landmarks A, B in the two portions.

It should further be noted in respect of this example that the same result is arrived at if the second map 20 is considered to be the reference map and the quality of the first map 10 should be assessed. The calculated values for the precision and the hit ratio then are interchanged, but the F1 characteristic remains the same.

Once the similarity value has been determined for the portion 11 in the first map 10 and the corresponding portion 21 in the second map 20, the method may be carried out again for a further portion 12 in the first map 10 and a corresponding further portion 22 in the second map 20. Here, the further portions 12, 22 are displaced in relation to the portions 11, 21 by a certain increment. This renders it possible to "travel" along a trajectory in the map consisting of a plurality of portions.

Figure 4:
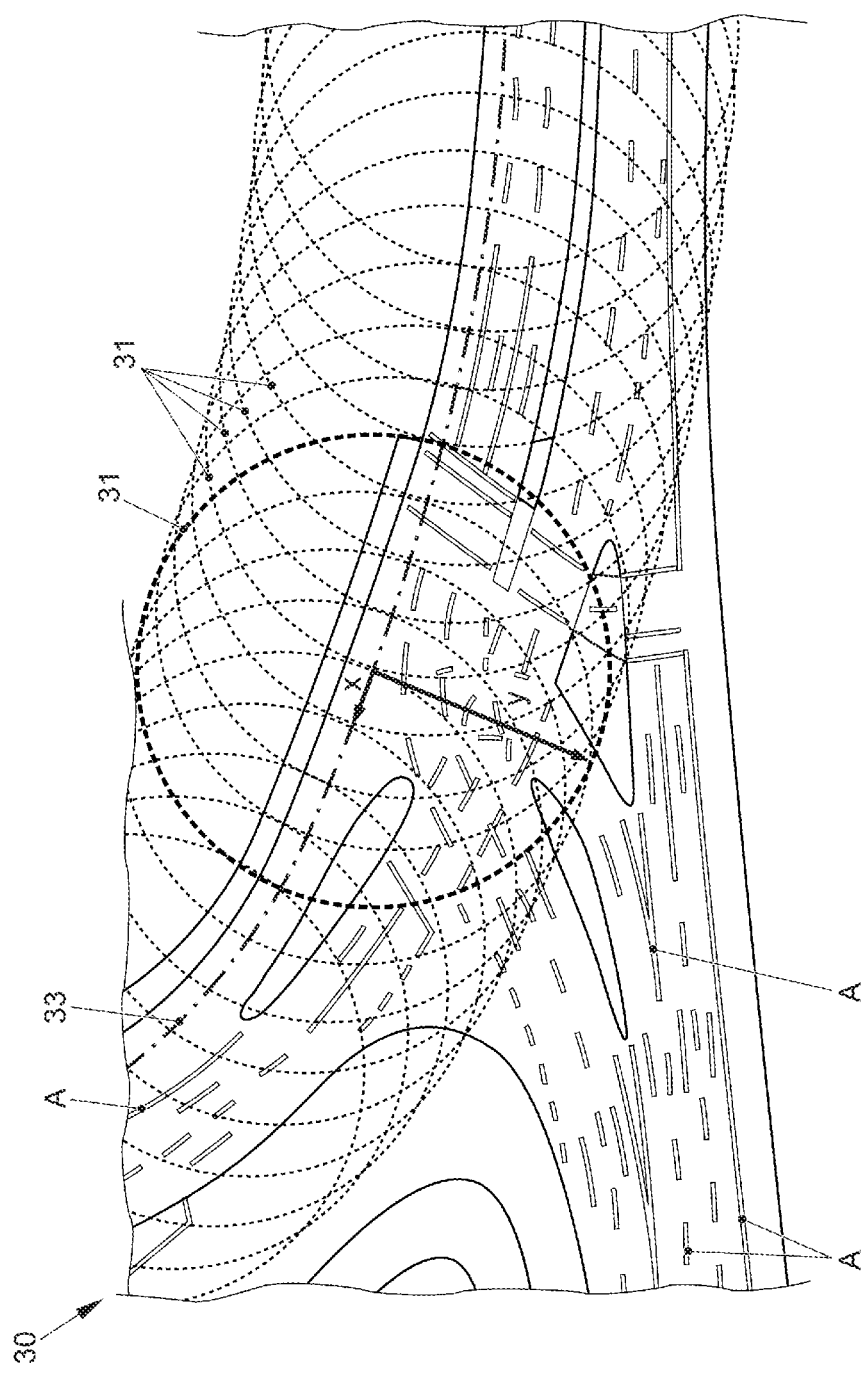
FIG. 4 shows a schematic illustration of a typical map with landmarks contained therein, for the purposes of elucidating the method.

For the purposes of elucidating the method, FIG. 4 shows a schematic illustration of a map 30 with landmarks A contained therein. Here, only some of the landmarks A are provided with a dedicated reference sign in an exemplary manner. Further, an exemplary subdivision of the map 30 into various portions 31 is illustrated. Here too, not every portion 31 was provided with a dedicated reference sign for reasons of clarity. Here, the portions 31 are selected with a circular shape with a radius y and a constant increment x along a trajectory 33 in a manner overlapping one another. The method is carried out accordingly (for the map 30 and corresponding portions in a second map) for each one of these portions 31. Here, it is possible to match the geometric form, the radius y and the increment x virtually without constraints to the corresponding conditions. By way of example, averaging may be achieved by a small increment x but, in comparison therewith, a relatively large radius y since landmarks A are respectively considered a number of times in various, but adjacent portions 31. If a finer resolution without averaging is desired, the values may be adapted accordingly.

Provision may be made for selecting a predetermined trajectory 33 along a well-suited test route for the comparison of two maps. By way of example, this may be a test route on which all provided landmarks A occur at least once or where a high density of landmarks A is prevalent such that the precision and the hit ratio may be well determined. Here, the test route should be selected in such a way that the latter, where possible, allows a representative statement about the entire map to be made.

Figure 5:
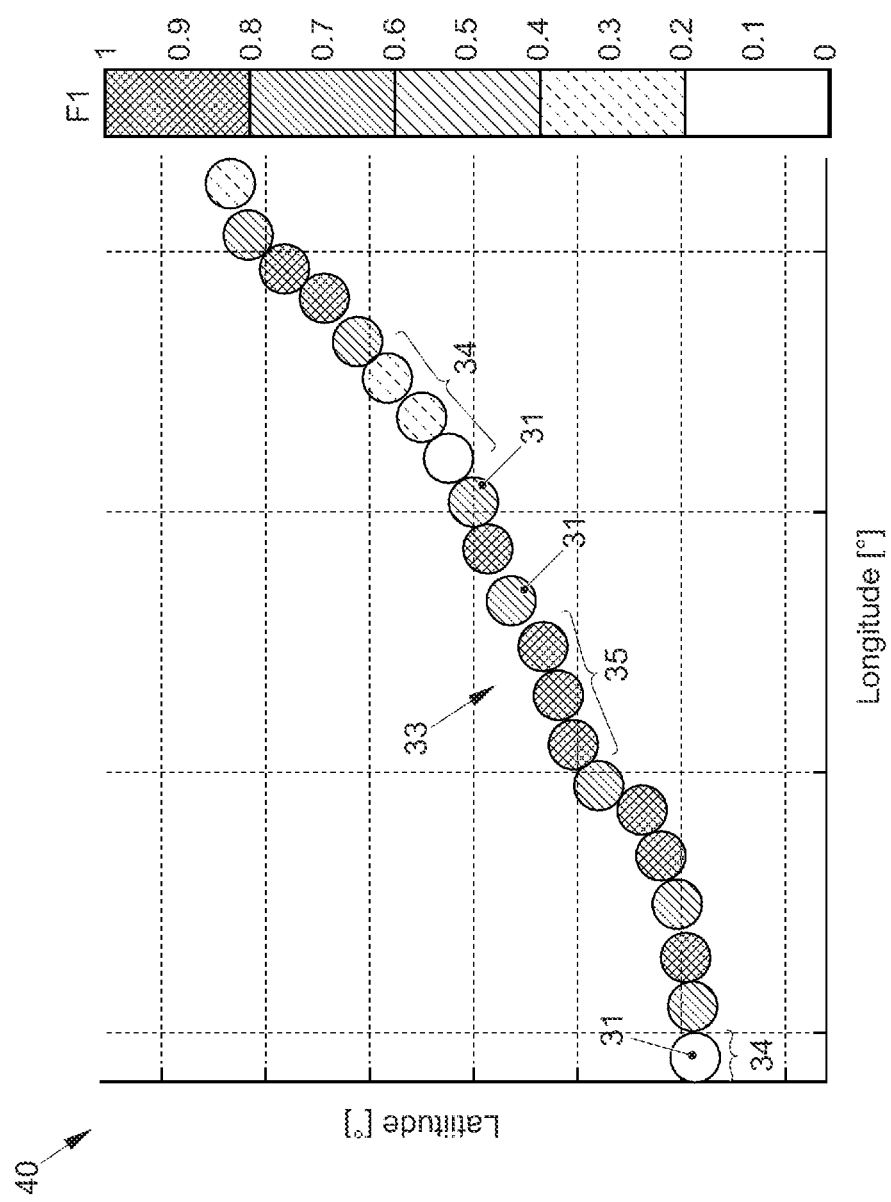
FIG. 5 shows a map with a trajectory, in which an F1 characteristic as a similarity value of two maps compared to one another is color-coded in grayscale values for individual portions.

The F1 characteristics calculated for individual portions may in each case be assigned to the corresponding positions of the portions. An example of such an assignment is shown schematically in FIG. 5. Here, individual portions 31 lying along a trajectory 33 were in each case assigned the F1 characteristic calculated for the portion 31 and a spatially resolved and color-coded (with shadowing) map 40 was subsequently created therefrom. The map 40 renders it possible to make a spatially resolved statement about the similarity of two maps compared to one another. By way of example, there exist sections 34 along the trajectory 33 which have a very low similarity (small F1) and sections 35 in which the similarity is high (large F1). This further facilitates assessing a map in respect of the quality thereof, for example, if a known map with a very high quality was used as a reference map. The shown gradation of the values for the F1 characteristic was merely selected in an exemplary manner here and it may be embodied more finely or more coarsely.

The method facilitates checking whether or not the quality of the map to be used is sufficient in a portion to be traversed before an automated journey is carried out. Furthermore, the method facilitates an efficient map quality comparison of possible maps from different producers. Incremental, quality-oriented map updating is also facilitated.

LIST OF REFERENCE SIGNS

1 Apparatus
2 Reception device
3 Comparison device
4 Output device
5 Similarity value
10 First map
11 Portion
12 Further portion
20 Second map
21 Portion
22 Further portion
30 Map
31 Portion
33 Trajectory
34 Section
35 Section
40 Map
50 Motor vehicle
51 Controller
52 Assistance system
100-111 Method operations
A Landmark
B Landmark
x Increment
y Radius

The invention claimed is:

1. A method for comparing two maps with landmarks stored therein, the method comprising:
 comparing at least one portion of a first map with a corresponding portion in a second map;
 determining a similarity between the at least one portion of the first map and the corresponding portion in the second map based on a correspondence between the landmarks respectively stored in the two portions, wherein the similarity is calculated based on an F1 characteristic defined by a precision function comprising calculation of the number of landmarks of the second map corresponding with landmarks of the first map relative to the total landmarks of the first map and a recall function comprising calculation of the number of landmarks of the second map corresponding with landmarks of the first map relative to the total landmarks of the second map; and
 expressing the similarity as a similarity value derived from the determined similarity for conducting an operation of an autonomous vehicle.

2. The method of claim 1, wherein a further similarity value is determined for at least one further portion in the first map and a corresponding further portion in the second map.

3. The method of claim 2, wherein the at least one portion and the at least one further portion form points on a continuous trajectory in the first map.

4. The method of claim 2, wherein the at least one portion and the at least one further portion overlap.

5. The method of claim 4, further comprising decomposing an overlap region of the first map and of the second map into other portions, wherein another similarity value is in each case determined for each of the other portions.

6. The method of claim 5, wherein the another similarity values determined for the decomposed other portions of the overlap region are stored in a map at positions corresponding to the respective other portions.

7. The method of claim 2, wherein the at least one corresponding portion and the at least one corresponding further portion form points on a continuous trajectory in the second map.

8. An apparatus for comparing two maps with landmarks stored therein, the apparatus comprising:
 a comparison device including a processor that compares at least one portion of a first map with a corresponding portion in a second map and determines a similarity between the portion of the first map and the corresponding portion in the second map based on a correspondence between landmarks respectively stored in the two portions, wherein the similarity is calculated based on an F1 characteristic defined by a precision function comprising calculation of the number of landmarks of the second map corresponding with landmarks of the first map relative to the total landmarks of the first map and a recall function comprising calculation of the number of landmarks of the second map corresponding with landmarks of the first map relative to the total landmarks of the second map, and wherein the comparison device further expresses the determined similarity of the compared portion as a similarity value derived from the determined similarity for conducting an operation of an autonomous vehicle.

9. A non-transitory computer readable medium storing thereon a computer program comprising program code for carrying out a method for comparing two maps with landmarks stored therein, when the program is executed on a computer, the method comprising:

comparing at least one portion of a first map with a corresponding portion in a second map;

determining a similarity between the at least one portion of the first map and the corresponding portion in the second map based on a correspondence between the landmarks respectively stored in the two portions, wherein the similarity is calculated based on an F1 characteristic defined by a precision function comprising calculation of the number of landmarks of the second map corresponding with landmarks of the first map relative to the total landmarks of the first map and a recall function comprising calculation of the number of landmarks of the second map corresponding with landmarks of the first map relative to the total landmarks of the second map; and expressing the similarity as a similarity value derived from the determined similarity for conducting an operation of an autonomous vehicle.

10. The non-transitory computer readable medium of claim 9, wherein the method further comprises selecting a predetermined trajectory for a test route for comparing the at least one portion of the first map with the corresponding portion in the second map.

11. The non-transitory computer readable medium of claim 10, wherein selecting the predetermined trajectory includes determining a representative density of landmarks along the predetermined trajectory.

* * * * *